United States Patent

Granados

[11] Patent Number: 5,522,964
[45] Date of Patent: Jun. 4, 1996

[54] AIR INJECTOR FOR COOLING ENVELOPE WELDINGS

[76] Inventor: Juan A. H. Granados, Joaquin Rodrigo No. 30, 28300 Aranjuez, Spain

[21] Appl. No.: 207,963

[22] Filed: Mar. 8, 1994

[30] Foreign Application Priority Data

Feb. 8, 1994 [ES] Spain ................................ 9400314

[51] Int. Cl.⁶ ............................................. B32B 31/00
[52] U.S. Cl. .................... 156/498; 156/350; 156/555; 156/359; 53/141; 53/372.3; 53/375.3
[58] Field of Search ................... 53/141, 372.3, 53/375.3; 156/498, 555, 350, 356, 357, 359

[56] References Cited

U.S. PATENT DOCUMENTS

| | | | |
|---|---|---|---|
| 3,712,020 | 1/1973 | Norr et al. .............................. | 53/412 |
| 3,714,720 | 2/1973 | Drost et al. ............................. | 34/120 |
| 4,272,944 | 6/1981 | Suga ....................................... | 53/511 |
| 4,364,892 | 12/1982 | Rehlen et al. ...................... | 156/498 X |
| 4,696,147 | 9/1987 | Noh ........................................ | 53/550 |

*Primary Examiner*—David A. Simmons
*Assistant Examiner*—Paul M. Rivard
*Attorney, Agent, or Firm*—Head & Johnson

[57] ABSTRACT

This invention refers to a continuous or intermittent air injection system for enveloping machines consisting in an air tubing comprising suitable air expulsion means, controlled by an electrovalve and equipped with at least two impulsion positions when are the positions confronting the sealed area of the envelope that allows the cooling of the welding, and the upper position which is the corresponding to the stoppage of the machine with the cooling of the thermowelding rollers that permits their temperature regulation and control.

3 Claims, 1 Drawing Sheet

AIR INJECTOR FOR COOLING ENVELOPE WELDINGS

OBJECT OF THE INVENTION

This invention refers to a continuous or intermittent air injection system for enveloping machines in order to improve the quality of the performed weldings, specially intended for food products, though enveloping for other products is not ruled out.

Similarly, it is used for temperature regulation and control of welding rollers during stoppages in order that it becomes unnecessary to disconnect them when intermittent stoppages are carried out during the process.

BACKGROUND OF THE INVENTION

Continuous enveloping of different products is an art which has been well known for a long time and which comprises a double apron feeder, with widths of various envelopes, inside of which, the product to be enveloped is inserted.

At present, due to marketing reasons, and also for sanitary reasons, bulk supplies are very scarce, not only those consisting of solid or pasty food products but also including those liquids which are not adequately packed.

The enveloping rate depends not only on the product. For example, the easiest one, because of particle size and external configuration, is sugar, though other factors are redundant in this process, as is the case of the characteristics of the material of the envelope which is normally plastic or paper laminate, the latter being generally plastified.

This material is bonded by means of the contact of the bevelled edges of triangular internal section, rollers which are parallel to each other and equipped with opposed rotation direction.

These cylinders normally comprise an electrical resistance thermal system, coactively rotational with the roller, fixedly attached, and consequently providing an intermediate heating rotational body: "Improvements In The Thermowelding Device", MU 9303010, of the present solicitant.

The continuous production line of envelopes which passes through at variable rate between both welding cylinders, varies in speed depending on these circumstances related to the materials used in the envelope and product to be enveloped.

According to economical reasons, it is useful to envelope the maximum possible number of envelopes, and this includes the possibility of bordering the acceptable temperature limits, either due to the more or less heat degradable type of product, or due to the envelope, which may become deformed by the effect of the heat, or to both reasons.

Up to the present, no solution to this problem is known other than that which plays with a number of rejections of envelopes allowing the profitability of this rise in temperature, the excess of the cooling time, etc.

On the other hand, the time of permanence in the normal running rate situation of the resistors, affects the economical efficiency of the machine after the stoppages, due to breakdowns, to offset of the envelopes during the vertical and horizontal cutting of the laminates, to misalignments of the latter, to product feeding problems and to a large etc.

It is recommended in all these cases to disconnect the resistors during the stoppage time, since the detection period for reheating by the thermostat is preset for the thermal cylinder when in operation not when stopped, this variation being sufficient for the generation of wastes in the production head, once it has recommenced.

SUMMARY OF THE INVENTION

The presently described system, consists in intercalating a continuous or intermittent cooling system between the thermal sealing of the envelopes and the cutting of the same.

This described system comprises the inclusion of an air blower, of the type used for diverse drives on the actual machine, which is made to influence the sealing area of the envelope, immediately after performing this thermal sealing operation.

To achieve this, an air tubing is confronted with the area occupied by the welding, comprising suitable air expulsion means, either by the use of simple orifices, with aligned nozzles, or by tearing it longitudinally and including a meshed part in the groove, this part being configured with the previously included driving means.

This air influences the thermowelded surface, sufficiently decreasing its temperature so that no shrinking which might hinder the cutting is produced, making the latter adopt a zig-zagging form, or simply, degrading the envelope or the product included inside.

This air injection tubing, controlled by an electrovalve, is radially positioned on its axis or over a parallel axis, equipped with at least two impulsion positions of the same.

The position confronting the envelope is the one corresponding to the normal running rate of the machine and the upper position is the one corresponding to the stoppage of the machine, with the cooling of the thermowelding rollers.

It is obvious, that besides the horizontal thermowelding of the envelopes, this arrangement of the air insufflation or air injector tubing also serves for the ortogonal welding of the previous one (vertical welding).

The upper position corresponds to the cooling of the actual rollers or, in this case, of one of them and of the line of envelopes, and through them, of the second and last.

DESCRIPTION OF THE DRAWINGS

To add further to the present description, and with the aim of presenting an improved and easier understanding of the features of the invention, a drawing, which is of illustrative nature and never non-limitative, is attached to the present descriptive document to form an integral part of the same and in which the following is represented:

The single FIGURE is a schematic view of the thermowelding rollers of opposed rotation, between which, the line of envelopes passes through, and in which a welding can be observed confronting the blower, whilst the rollers proceed to start the following welding.

Figure 1:
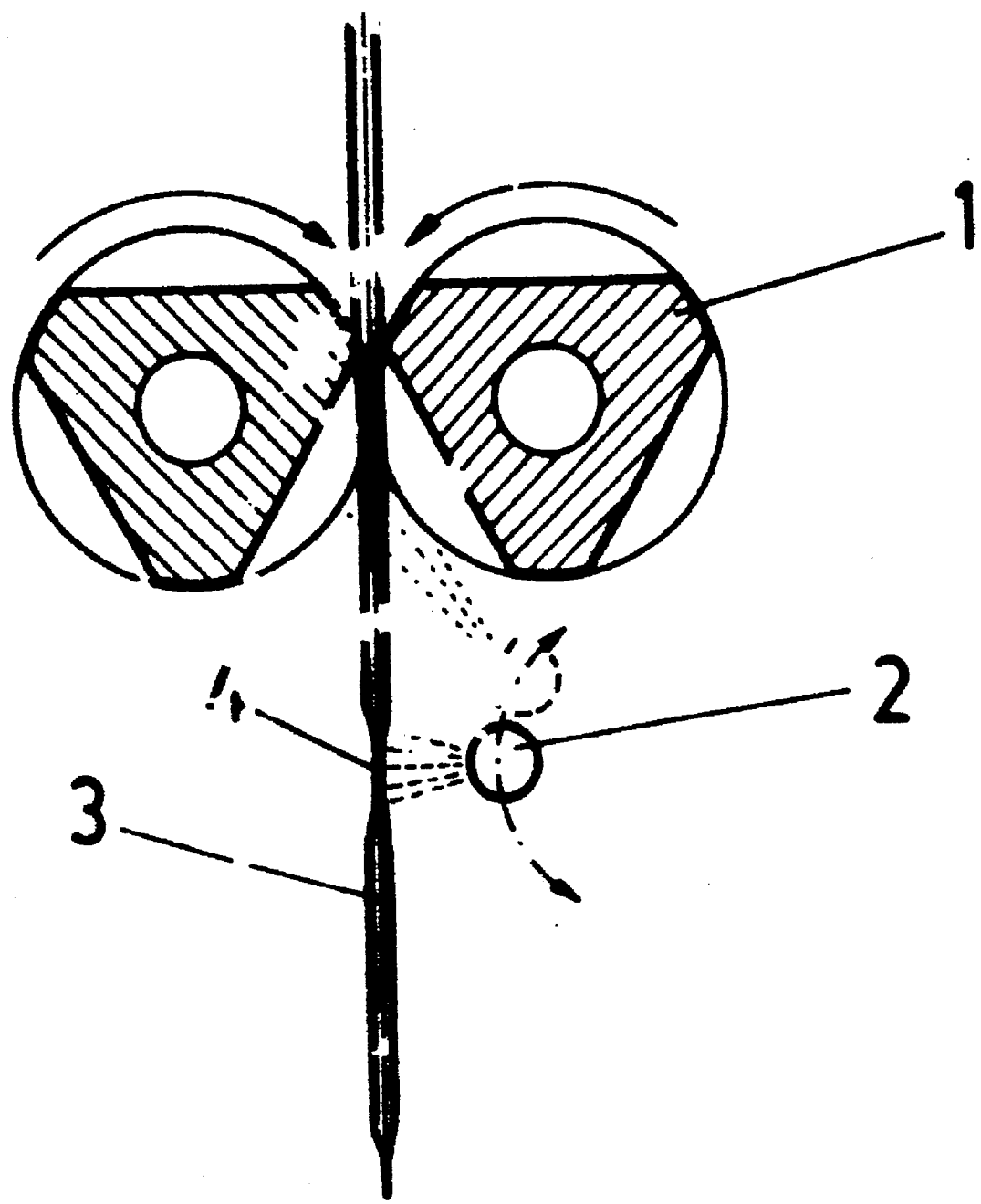

It can also be schematically observed how the air blower, shown by a dotted line, is situated confronting or facing the contact area of the rollers, in a hypothetical situation in which the stoppage would have been performed at this point during the course of the envelope production line.

PREFERRED EMBODIMENT OF THE INVENTION

According to these described figures, it may be observed how the recommended invention comprises an air blowing conduit (2), of the actual machine, which influences the sealed area (4) of the envelope (3) immediately after the thermal sealing, by means of the thermowelding cylinder (1) of opposed rotation, confronting the welding area (4) with the air tubing (2), which is equipped with simple orifices, nozzles, etc. decreasing its temperature.

This air injection tubing (2) is radially placed, on its axis or on a parallel axis, equipped with various positions: at least, the position confronting or facing the envelope is of the normal running rate and the upper position is the cooling of the thermowelding rollers, the second of them, direct if the production line of envelopes has been removed, or by default, by its continuous cooling.

The air injector for cooling the welding of envelopes, may be placed both manually and automatically, the latter may be governed by a microprocessor.

This description is not further continued on the understanding that any expert in the art should have sufficient information for comprehending the scope of the invention and its derived advantages, as well as how to proceed to produce the same.

It is apparent, that on condition that the essence of the invention remains unaltered, both the changes of materials and the shape, the size and the arrangement of the elements are susceptible to variations as come within the scope of the same.

The terms used throughout the description and the meaning of the same must be considered always as non-limitative.

What is claimed is:

1. An air injector system for cooling envelope weldings, which system comprises:

a continuous enveloping machine including thermowelding rotating rollers in discontinuous contact with said envelope at a variable stepping rate to seal weldings into a continuous envelope;

an air tubing including air expulsion means for blowing air, situated in rectilinear generatrix of one said welding, said air expulsion means discontinuously performed according to passing of said one welding to cool said one welding of said envelope immediately after sealing by said rotating thermowelding rollers; and said tubing having a center axis radially positionable in at least two positions, one of said positions being a normal running rate for cooling the residual heat of the welding of the same and another position, for cooling the thermowelding rollers.

2. An air injector system for cooling envelope weldings according to claim 1, characterized in that the position of said air injection tubing may be automatically positioned.

3. An air injector system for cooling envelope weldings as set forth in claim 2 wherein said automatic positioning of said conduit is controlled by a microprocessor.

* * * * *